Jan. 30, 1968     M. J. PASCULLE     3,366,864
AUXILIARY COMMUTATING FIELD FOR DIRECT CURRENT MOTORS
Filed April 28, 1965
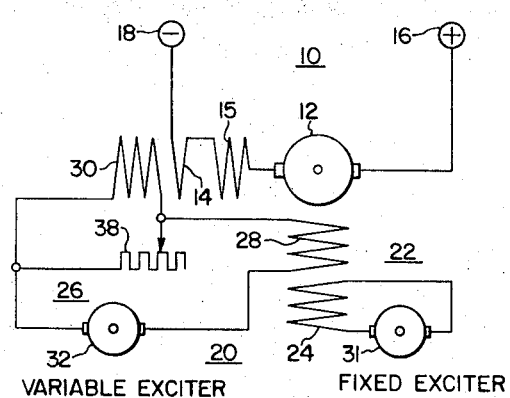
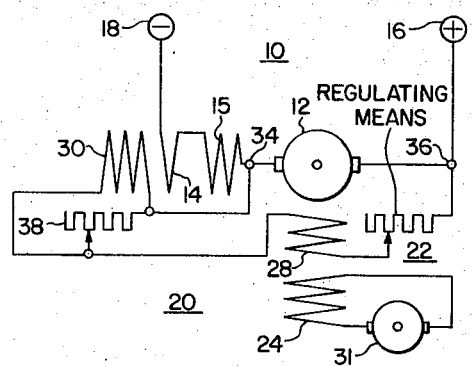
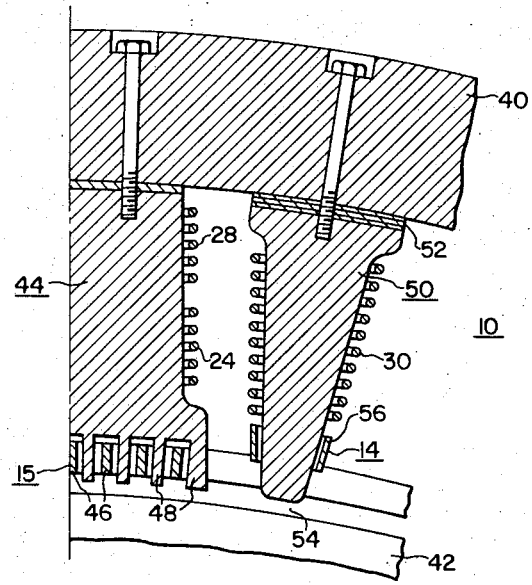
WITNESSES
INVENTOR
Maurice J. Pasculle
BY *E. F. Possessky*
ATTORNEY

United States Patent Office 3,366,864
Patented Jan. 30, 1968

3,366,864
AUXILIARY COMMUTATING FIELD FOR DIRECT CURRENT MOTORS
Maurice J. Pasculle, Wilkinsburg, Pittsburgh, Pa., assignor to Westinghouse Electric Corporation, Pittsburgh, Pa., a corporation of Pennsylvania
Filed Apr. 28, 1965, Ser. No. 451,578
3 Claims. (Cl. 318—350)

ABSTRACT OF THE DISCLOSURE

A direct current dynamoelectric machine having a series commutating field winding and an auxiliary commutating field winding excited by the shunt field current. In order to obtain good commutation over a wide range of speeds and loads, the shunt field is divided into a portion with constant excitation and a portion with variable excitation, and the auxiliary commutating field winding is excited only by the current of the variably excited shunt field portion.

---

The present invention relates to dynamoelectric machines and more particularly to variable speed direct current motors in which commutating flux is controlled to obtain improved commutation over a wide range of motor speeds from no load to overload conditions.

In a variable speed direct current motor, a shunt field winding is disposed on main stator field poles so as to provide variable field excitation for variation of the motor speed at various load conditions. A commutating winding, disposed on interpoles between the main field poles, is normally connected in series with the motor armature and with a compensating winding so as to generate magnetic flux in the commutation zone in proportion to the armature current and thereby generally establish flux conditions in the commutation zone suitable for sparkless commutation. However, paricularly in relatively large variable speed motors, the commutating flux produced by the series commutating windings does not always conform to the commutating flux actually needed for sparkless commutation under all load and field excitation conditions.

In U.S. Patent 2,666,882 entitled, "Auxiliary Commutating Field," issued on Jan. 19, 1954, to the present inventor and assigned to the present assignee, there is disclosed a motor in which an auxiliary commutating field is employed in the shunt field winding circuit in such a manner as to produce improved commutation over a wide range of loads and field excitation without requiring the use of a variable heavy current shunt resistance across the series commutating winding as previously had been required. The auxiliary commutating winding thus generally provided improved commutation without the inconvenient requirements of manufacturing special variable shunt resistances and subjecting such resistances to automatic or other variation as the field excitation was wired during motor use.

One difficulty with the scheme disclosed in U.S. Patent 2,666,882 is that in many motor designs the auxiliary commutating winding cannot be adjusted to produce sparkless commutation at both full load and no load conditions and at various shunt field excitation levels. The difficulty stems from the fact that a component of the field current flows through the auxiliary commutating winding at all load and field excitation conditions. Thus, the auxiliary commutating current is set to optimize commutation at full load operation and usually at the base or weak field excitation level, and at no load auxiliary commutating current flows, although it is not needed, to produce overcompensating commutating flux and some degree of no load commutation sparking at all field excitation levels.

Another difficulty with the scheme is that at overload conditions the resultant commutating MMF has an undercompensating effect since the auxliliary commutating current is too low to produce the commutating MMF which is then required for sparkless commutation. Although undercompensation at overload can be advantageous in applications where it is desired to have a droop in the speed characteristic at overload, there are other applications where speed maintenance for limited time periods at overload is desirable and where simultaneously commutator sparking in desirably to be minimized.

In a copending application entitled "Differential Bias Auxiliary Commutating Field," Ser. No. 169,321, filed by M. J. Pasculle and D. M. Calabrese on Jan. 29, 1962, now Patent No. 3,201,626, issued August 17, 1965, and assigned to the present assignee, a differential auxiliary commutating field is employed in conjunction with a cumulative auxiliary commutating field so as to cancel the cumulative auxiliary commutating flux at no load and at weak field excitation. Commutator sparking is thus theoretically eliminated at the motor operation condition and is theoretically reduced at higher excitation levels and higher loads, but, in practice, difficulty arises in realizing the theorized benefits since the series commutating winding and the cumulative and differentail auxiliary commutating windings are physically wound on the same interpoles.

The difficulty is primarily caused by ripple in the motor armature circuit current which flows through the series commutating coil and in turn induces a high voltage in the differential auxiliary commutating coil. A similar objectionable condition can be caused by mutually induced voltages which are generated by ripples in the direct current waveform supplied to the auxiliary commutating windings from commercially available direct current supply systems normally used for field excitation purposes.

In accordance with the principles of the present invention, a variable speed dynamoelectric machine comprises an armature along with a series compensating winding and a series commutating winding connected in series with the armature. A first excitation circuit provides for energizing a first shunt field winding preferably at a substantially fixed voltage to produce a fixed weak field excitation level. A second excitation circuit provides for variably energizing a second shunt field winding and a auxiliary commutating winding, and the second circuit is operated substantially only when field excitation levels above the fixed weak field excitation level are desired.

In this manner, no load commutator sparking is reliably eliminated and good commutation is provided with increasing load at the fixed weak excitation level. At high excitation levels, no load and overload commutator sparking is materially reduced and good commutation is provided from no load to full load.

It is therefore an object of the invention to provide a novel direct current dynamoelectric machine in which improved commutation is achieved.

Another object of the invention is to provide a novel variable speed direct current motor in which improved commutation is achieved over a relatively wide operating range of motor loads and speeds.

A further object of the invention is to provide a novel variable speed direct current motor in which auxiliary commutating flux is employed in an improved manner to produce good commutation at understood and full load condition and to produce improved commutation compensation at overload conditions when the field is set above weak excitation.

An additional object of the invention is to provide a novel variable speed direct current motor in which auxiliary commutating flux is employed in an improved manner to eliminate commutator sparking at no load and to produce good commutation at underload and higher load conditions and to produce improved commutating compensation.

These and other objects of the invention will become more apparent upon consideration of the following detailed description along with the attached drawing, in which:

FIGURE 1 is a schematic circuit diagram of a variable speed direct current motor arranged in accordance with the principles of the invention;

FIG. 2 shows a schematic diagram of a modified form of the circuit shown in FIG. 1; and FIG. 3 is a fragmentary view of the motor illustrating the physical positions of the motor windings.

More specifically, there is shown in FIG. 1 a dynamoelectric machine in the form of a variable speed direct current motor 10 having an armature 12, a series commutating winding 14 and a series compensating winding 15 connected in series between direct current supply terminals 16 and 18. The motor 10 is provided with shunt field excitation means 20 and can have a series field winding (not shown) if desired to produce a slight compounding effect.

The shunt field means 20 comprises an excitation circuit 22 for energizing a first shunt field winding 24 and another excitation circuit 26 for energizing a second shunt field winding 28. An auxiliary commutating winding 30, disposed in cumulative relation to the series commutating winding 14, is connected in the excitation circuit 26 in a series loop with the second field winding 28.

Preferably, a separate fixed direct current voltage source or fixed direct current exciter 31 is employed for energizing the excitation circuit 22. The excitation circuit 26 is preferably energized by direct current voltage regulating means or a variable direct current exciter 32.

If desired, the field winding 28 can be connected for self-excitation as indicated by the reference characters 34 and 36 in FIG. 2, or both field windings 24 and 28 (not shown) can be connected for self-excitation. Further, the auxiliary commutating winding 30 can be connected in parallel circuit relation to the field winding 28 as shown in U.S. Patent 2,666,882 or other conventional variations and additions can be made in the motor circuitry if desired.

As similarly described in the above-mentioned patent, adjustable resistance means or a rheostat 38 is connected across the auxiliary commutating winding 30 in order to provide any necessary adjustment of the current in the auxiliary commutating winding 30. In the motor 10, the variable resistor 38 is preferably set to produce good commutation at all loads and for all field excitations in excess of the weak field excitation setting.

The field winding 24 is preferably the smaller of the two shunt windings, and it is preferably energized by the fixed exciter 31 to produce the weak field (high speed) excitation level. At that level, the regulating means 32 supplies substantially no energy to the shunt field winding 28 and the auxiliary commutating winding 30. In some cases, however, it is desirable to employ nominal or slight excitation of the field winding 28 by the regulating means or the variable direct current exciter 32 in order to provide for adjustment of the "weak excitation level" setting in the finished motor control apparatus. In any event, at the weak excitation level and at no load, commutator sparking is substantially eliminated since excess commutating MMF is eliminated through the substantial elimination of field current through the auxiliary commutating winding 30 at that motor operating condition. With higher loads at the weak excitation level, commutation is generally good.

To obtain lower motor speed, the field winding 28, which produces sufficient ampere turns to exceed the weak excitation level by as much as five times or more, is increasingly energized by increasing the output of the regulating means 32. As field current increases in the field winding 28, current through the auxiliary commutating winding 30 increases to maintain good commutation with increasing field excitation at underload and full load conditions. At motor overload conditions, commutation is also relatively improved since the auxiliary commutating winding 30 carries only a part of the "total" field excitation current in the two field windings 24 and 28.

The fragmentary view of FIG. 3 shows a typical construction embodying the invention in a motor having a stator 40 and a rotor 42. The shunt field windings 24 and 28 are separately wound on a plurality of main poles 44 (only one shown). The series compensating winding 15 comprises straps 46 disposed in slots in faces 48 of the main poles 44. Interpoles 50 are disposed between the main poles 44 and are mounted on shims 52 which provide for adjusting the interpole air gap 54.

The series commutating winding 14 comprises one or more strap turns 56 on each interpole 50, and the auxiliary commutating winding 30 comprises smaller wire also wound about each interpole 50. Since a differential auxiliary commutating winding is not used on the interpole 50 by the terms of the present invention, mutual voltage induction of the type encountered in the referenced Calabrese and Pasculle copending application is eliminated and improved commutation is realized under various motor load and excitation levels for the reasons already described.

The foregoing description has been presented only to illustrate the principles of the invention. Accordingly, it is desired that the invention be not limited by the embodiments described, but, rather, that it be accorded an interpretation consisting with the scope and spirit of its broad principles.

What is claimed is:

1. A variable speed direct current motor comprising an armature, series commutating field winding means in series with said armature, shunt field winding means having first and second portions, means for providing substantially constant excitation for said first portion of the shunt field winding means for weak field operation of the motor, said series commutating field winding being adapted to provide the correct commutating flux under all load conditions during weak field operation, means for providing variable excitation for said second portion of the shunt field winding means for operation of the motor at increased field strength, and an auxiliary commutating field winding connected to be energized by at least a part of the current of said second portion of the shunt field winding means.

2. A variable speed direct current motor as defined in claim 1 in which the shunt field winding means comprises first and second shunt field windings, first excitation circuit means for providing substantially constant excitation for said first shunt field winding, and second excitation circuit means for providing variable excitation for said second shunt field winding.

3. A variable speed direct current motor as defined in claim 2 in which said second excitation circuit means includes regulating means for controlling said variable excitation.

References Cited

UNITED STATES PATENTS

| | | | |
|---|---|---|---|
| 2,666,882 | 1/1954 | Pasculle | 310—224 X |
| 1,700,534 | 1/1929 | Johnson | 318—355 X |

MILTON O. HIRSHFIELD, *Primary Examiner.*

D. L. DUGGAN, *Assistant Examiner.*